United States Patent [19]

Cielo

[11] Patent Number: 5,562,407
[45] Date of Patent: Oct. 8, 1996

[54] HAND-HELD ODOR DISSIPATING AND REMOVING DEVICE

[76] Inventor: Kevin K. Cielo, R.D. 6, Box 220, Punxsutawney, Pa. 15767

[21] Appl. No.: 470,589

[22] Filed: Jun. 7, 1995

[51] Int. Cl.⁶ .............................. F04D 29/52; F04D 29/70; B01D 46/10
[52] U.S. Cl. .................. 415/121.2; 415/220; 416/63; 416/146 R; 417/234; 417/411; 417/423.9; 55/357; 55/471
[58] Field of Search ............................ 415/121.2, 121.3, 415/213.1, 214.1, 220; 416/63, 146 R, 170 R; 417/234, 411, 423.9; 55/279, 357, 471, 472

[56] References Cited

U.S. PATENT DOCUMENTS

| | | | |
|---|---|---|---|
| 2,788,085 | 4/1957 | Waller | 55/357 |
| 3,516,232 | 6/1970 | Gilbertson | 416/146 R |
| 3,966,442 | 6/1976 | Waters | 55/471 |
| 4,043,776 | 8/1977 | Orel . | |
| 4,177,045 | 12/1979 | Orel . | |
| 4,604,110 | 8/1986 | Frazier . | |
| 4,781,526 | 11/1988 | Mead | 415/121.2 |
| 4,875,914 | 10/1989 | Wireman . | |
| 4,884,314 | 12/1989 | Miner et al. | 417/234 |
| 4,900,346 | 2/1990 | Lutz . | |
| 5,139,546 | 8/1992 | Novabilski . | |

*Primary Examiner*—James Larson
*Attorney, Agent, or Firm*—Banner & Allegretti, Ltd.

[57] ABSTRACT

A hand-held deodorizer which includes a cylindrical housing having a centrally mounted fan, and upper and lower air permeable barriers. At least one of the air permeable barriers includes a filter which absorbs odors from air drawn therethrough. The deodorizer further includes a U-shaped handle attached to the periphery of the housing disguising the deodorizer so it resembles a drinking mug. The handle contains batteries and a push-button switch permitting the user to selectively provide power to rotate the fan. The deodorizer can easily be transported and manipulated by the handle and placed adjacent a source of wretched odor. Upon actuation of the push-button switch, the fan draws air from the source of odor through the filter or filters where the wretched odor is reduced or eliminated, and dissipates the odor-reduced air into the surrounding environment. A fragrance impregnated member masks the scent of the dissipated air by providing it with a pleasant odor. The air permeable barriers prevent a person from placing his finger or an object into the housing, and in turn, prevent damage to the deodorizer and possible injuries.

20 Claims, 4 Drawing Sheets

HAND-HELD ODOR DISSIPATING AND REMOVING DEVICE

FIELD OF THE INVENTION

The present invention relates to a hand-held deodorizer which can be used to treat malodorous air from a source. More specifically, the present invention relates to a hand-held deodorizer which includes a housing, a filter, and a fan which draws air from the source of odor through the filter, where the odor is reduced or eliminated, and dissipates the odor-reduced air into the surrounding environment.

BACKGROUND OF THE INVENTION

Prior devices in the field of fan induced odor removal have been directed to absorbing odors and contaminates from cigarettes and cigars to prevent fouling of the surrounding atmosphere. Accordingly, these devices include an ash tray, typically require electrical connection to an electrical outlet, and do not include a handle facilitating the gripping of the device by a user for easy manipulation and transportation. Accordingly, these devices are impractical or impossible to easily transport and position adjacent all sources of odor.

SUMMARY OF THE INVENTION

In view of the foregoing, it is a principal object of the present invention to provide an improved deodorizer.

More specifically, it is an object of the invention to provide a hand-held deodorizer which is easily transportable and maneuverable for positioning adjacent any source of odor.

Another object is to provide a hand-held deodorizer whose appearance disguises its actual function, and ordinary observers would surmise that the deodorizer is a drinking mug.

It is yet another object of the invention to provide a deodorizer which includes a self-contained power supply system so the deodorizer does not depend on a connection to an electrical outlet.

These and other objects are achieved by the present invention which, according to one aspect, provides a portable hand-held apparatus for dissipating odors from a source. The apparatus includes a tubular housing, a handle extending from the exterior surface of the housing, an air drawing and exhausting device positioned in the housing interior and attached to the housing, first and second air permeable partitions, a self-contained power supply device, and an operating device. The housing includes an interior wall surface, an exterior wall surface, an air inlet at a first longitudinal end, and an air outlet at a second longitudinal end. The housing interior is defined by the interior wall surface between the first longitudinal end and the second longitudinal end. The handle includes two spaced apart end sections and a center section therebetween. The spaced apart end sections each include a first end located immediately adjacent the housing and a second end located distal from the housing. The center section is connected to the second ends of the end sections. The exterior wall surface of the housing, the end sections, and the center section form a void area therebetween, and the handle and the void area facilitates the grasping of the apparatus. The air drawing and exhausting device includes a plurality of fan blades, a motor, and a shaft fixedly attached to the fan blades and rotatably coupled to the motor, and energizing the motor causes the fan blades to rotate. The first air permeable partition is attached to the housing and is substantially disposed in the housing interior between the air drawing and exhausting device and the first longitudinal end, and the second air permeable partition is attached to the housing and is substantially disposed in the housing interior between the air drawing and exhausting device and the second longitudinal end. One of the partitions includes a purification filtering device which absorbs odors in air drawn therethrough. The self-contained power supply device is electrically coupled to the fan motor, and the operating member electrically coupled to the fan motor and the power supply device which permits the selective energizing of the fan motor. Displacement of the operating member causes the air drawing and exhausting device to draw odorous air from the environment adjacent the air inlet into the air inlet, through the first air permeable partition, and exhaust the air through the second air permeable partition and out of the air outlet, dissipating the air into the surrounding environment. The purification filtering device reduces the odorous content of the air between the air inlet and the air outlet such that the dissipated air exhausted from the air outlet is less odorous than the air drawn into the air inlet.

In another aspect, the invention provides a portable hand-held apparatus for dissipating odors from a source. The apparatus includes a cylindrical housing, a handle extending from the exterior surface of the housing, an air drawing and exhausting device positioned in the housing interior and attached to the housing, first and second air permeable partitions, a self-contained power supply device, and an operating device. The housing includes an interior wall surface, an exterior wall surface, an air inlet at a first longitudinal end, and an air outlet at a second longitudinal end. The housing interior is defined by the interior wall surface between the first longitudinal end and the second longitudinal end. The handle extends from the exterior surface of the housing for grasping by a user. The air drawing and exhausting device including a plurality of fan blades, a motor, and a shaft fixedly attached to the fan blades and rotatably coupled to the motor, and energizing the motor causes the fan blades to rotate. The first air permeable partition is attached to the housing and is substantially disposed in the housing interior between the air drawing and exhausting device and the first longitudinal end, and the second air permeable partition is attached to the housing and is substantially disposed in the housing interior between the air drawing and exhausting device and the second longitudinal end. One of the partitions includes a purification filtering device which absorbs odors in air drawn therethrough. The self-contained power supply device is electrically coupled to the fan motor, and the operating member is electrically coupled to the fan motor and the power supply device which permits the selective energizing of the fan motor. Displacement of the operating member causes the air drawing and exhausting device to draw odorous air from the environment adjacent the air inlet into the air inlet, through the first air permeable partition, and exhaust the air through the second air permeable partition and out of the air outlet, dissipating the air into the surrounding environment. The purification filtering device reduces the odorous content of the air between the air inlet and the air outlet such that the dissipated air exhausted from the air outlet is less odorous than the air drawn into the air inlet. The cylindrical housing of the apparatus is completely unobstructed at its air inlet and at its air outlet, for maneuvering and positioning of the apparatus immediately adjacent the source of odor.

These and other objects and features of the invention will be apparent upon consideration of the following detailed

DETAILED DESCRIPTION OF THE PREFERRED EMBODIMENT

Figure 1:
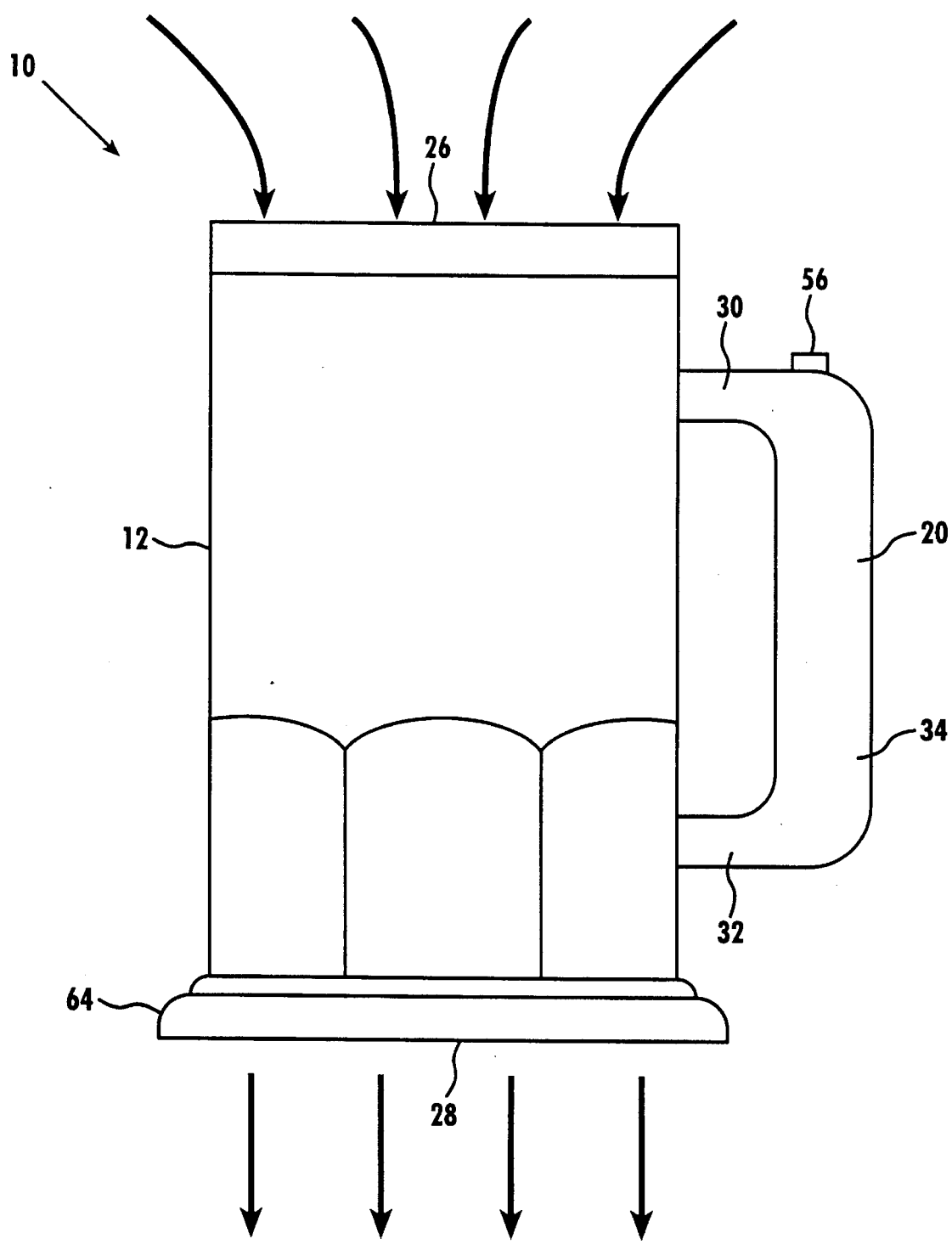
FIG. 1 is a side elevational view of the hand-held odor dissipating and removing device of the present invention.

In the present invention, as pictured in FIGS. 1–3, a hand-held odor dissipating and removing device, hereinafter "deodorizer", is designated generally by reference numeral 10. Briefly, deodorizer 10 includes a housing 12, an air drawing system, e.g., fan 14, an upper air permeable barrier 16, a lower air permeable barrier 18, a handle 20, and a self-contained manually-controllable power supply system which supplies electricity to fan 14. In sum, fan 14 draws air from a source of odor through one or more filtering devices, where the odor is reduced or eliminated, and optionally through an odor masking device where the air is pleasantly scented, and dissipates the odor-reduced, and now pleasant smelling, air into the surrounding environment.

Housing 12 is preferably a cylindrical tubular member which includes an inner wall 22, and outer wall 24, and provides an air inlet 26 at one longitudinal end, e.g., the top, and an air outlet 28 at the other longitudinal end, e.g., the bottom. Handle 20 extends from housing 12 and is U-shaped having an upper horizontal portion 30, a lower horizontal portion 32, and a vertical portion 34. Upper and lower horizontal portions 30 and 32 each include a first end attached to outer wall 24 of housing 12, with the ends distal from the housing 12 connected by vertical portion 34. In a preferred embodiment, housing 12 and handle 20 are made of a material which includes a plastic and are formed in the same molding operation. However, it is evident that numerous other materials and/or manufacturing techniques could be used.

Fan 14, upper air permeable barrier 16, and lower air permeable barrier 18 are mounted in the interior of housing 12. Fan 14 includes fan blades 36, a motor 38, and a rotatable shaft 40 which is fixedly mounted to fan blades 36 and rotatably coupled to motor 38. Mounting brackets 42 may take any desired form, and each preferably extends radially outward from fan motor 38, and is attached to the inner wall 22 of housing in any desired manner. Further, inner wall 22 of cylindrical housing 12 may include structure, e.g., one of more annular ribs or grooves, facilitating the mounting and retaining of mounting brackets 42 thereto.

When motor 38 of fan 14 is energized, fan blades 36 rotate with shaft 40 and are shaped to draw air in the environment adjacent air inlet 26 through housing 12, and dissipate the air out through air outlet 28, as indicated by the arrows in FIG. 1. Additionally, it should be noted that the air inlet 26 and air outlet 28 are as dictated by fan 14. Thus, it is recognized that the air inlet and air outlets could be reversed by mounting fan 14 in an orientation 180° offset from the illustrated arrangement, by changing the polarity of motor 38 causing shaft 40 to rotate in the opposite direction, or by using fan blades 36 which are shaped to create air flow in the opposite direction.

Upper air permeable barrier 16 and lower air permeable barrier 18 are preferably removably mounted within housing 12, and each perform a number of functions. First, at least one of upper and lower air permeable barriers 16 and 18 include an air treatment or purification filter which absorbs odors in air drawn therethrough. Additionally, upper and lower air permeable barriers 16 and 18 prevent the user or another person from putting a finger or other object inside housing 12 and damaging fan 14 and/or injuring himself.

In the preferred arrangement, upper air permeable barrier 16 preferably includes a frame 44 and a filter member 46. Frame 44 is sized slightly smaller in diameter than inner wall 22 of housing 12 to facilitate the mounting thereto. Filter member 46 is an air permeable device which includes one or more compositions used in filter members for absorbing odors, possibly including, but not limited to, charcoal, carbon, silica gel, zeolite, etc. Thus, odorous air which flows through filter member 46 exits filter member 46 with a reduced or eliminated odorous content.

Lower air permeable barrier 18 preferably includes a frame 48, a screen 50, and a filter member 52. Similar to frame 44 of upper barrier 16, frame 48 is sized slightly smaller in diameter than inner wall 22 of housing 12 to facilitate the mounting thereto. Filter member 52 may be similar to filter member 46 except that it is preferably impregnated with a odor-pleasing fragrance which masks undesirable odors which may exist in the air drawn through housing 12. Thus, any air which may have an undesirable odorous content after leaving filter 44, is forced through filter 52, where the undesirable odorous content is further reduced and/or eliminated, and the scent of the air dissipated from air outlet 28 is masked with a pleasant smelling fragrance. An optional screen 50 provides enhanced protection against the insertion of a finger or object into housing 12, and may be used in lower barrier 18, as illustrated, and/or in upper barrier 16, not shown. In lieu of a separate screen 50, frames 44 and 48 may include meshing across filter material 46 and 52 to act as a screen.

It is recognized that lower air permeable barrier 18 may include a screen and a fragrance impregnated material without a filtering material, as the odor content in the air drawn through housing 12 may be sufficiently reduced by filter 46 in upper barrier 16. Further, lower air permeable barrier 18 may include only a screen, and a fragrance impregnated material may be included in upper air permeable barrier 16, as such an arrangement would still reduce and/or eliminate the odors by filter 46 in upper barrier 16, and the fragrance impregnated material in upper air permeable barrier 16 would function to mask the scent of the air.

Each barrier 16 and 18 is preferably removably attached to inner wall 22 of housing 12 by a conventional manner. For example, frames 44 and 48 of upper and/or lower barriers 16 and 18 may include spring clips, not shown, which frictionally engage inner wall 22 of housing 12, or projections or detents located on inner wall 22 of housing 12. In an alternative arrangement for removably mounting barriers 16 and 18 to housing 12, the annular edge of frames 44 and 48 may be externally threaded for interfacing with internal threads on inner wall 22 of housing 12. Further, while upper and lower barriers 16 and 18 are shown as longitudinally spaced inward from the air inlet 26 and air outlet 28, respectively, it may be desirable to mourn barriers 16 and 18 flush with, or immediately adjacent, air inlet 26 and air outlet 28 to facilitate the mounting of the barriers 16 and 18. Positioning barriers 16 and 18 flush with or immediately adjacent air inlet 26 and air outlet 28 permits a mounting arrangement in which barriers 16 and 18 can interface with the longitudinal ends of housing 12. Depending upon the type of barrier mourning arrangement used, it may also be desirable to include positioning stops 53 on inner wall 22 of housing 12 to prevent barriers 16 and 18 from interfering with the operation of fan 14. As barriers 16 and 18 are removably mounted inside housing 12, either or both barriers 16 and 18 can be periodically replaced to obtain maximum performance from filters 46 and 52.

An electrical circuit including a self-contained power supply system is used to electrically power fan motor 38 for creating the desired air flow. As schematically illustrated, the electrical circuit includes one or more portable power supplies, i.e., batteries 54, a manually operable switch 56, and fan motor 38. In a preferred embodiment, switch 56 is normally open and permits the user to selectively complete the circuit supplying electrical current from batteries 54 to fan motor 38. At least vertical portion 34 of handle 20 is hollow permitting batteries 54 to be conveniently mounted therein. Batteries 54 can be installed, removed, and replaced via a removable panel 58, as schematically illustrated in FIG. 3. Further, a portion of at least one of the horizontal portions 30 and 32 includes a hollow passageway through which electrical wires of the circuit pass. Such an arrangement permits the electrical system to be entirely contained within deodorizer 10.

In one preferred arrangement, manually operable switch 56 is spring biased into a normally open position, and the circuit is completed upon the user depressing switch 56. However, it is recognized that numerous other electrical circuits and/or switches may be used. Further, it is also recognized that a variable current switch could be used allowing the user to regulate the velocity of fan blades 36 and the air flow.

Figure 2:
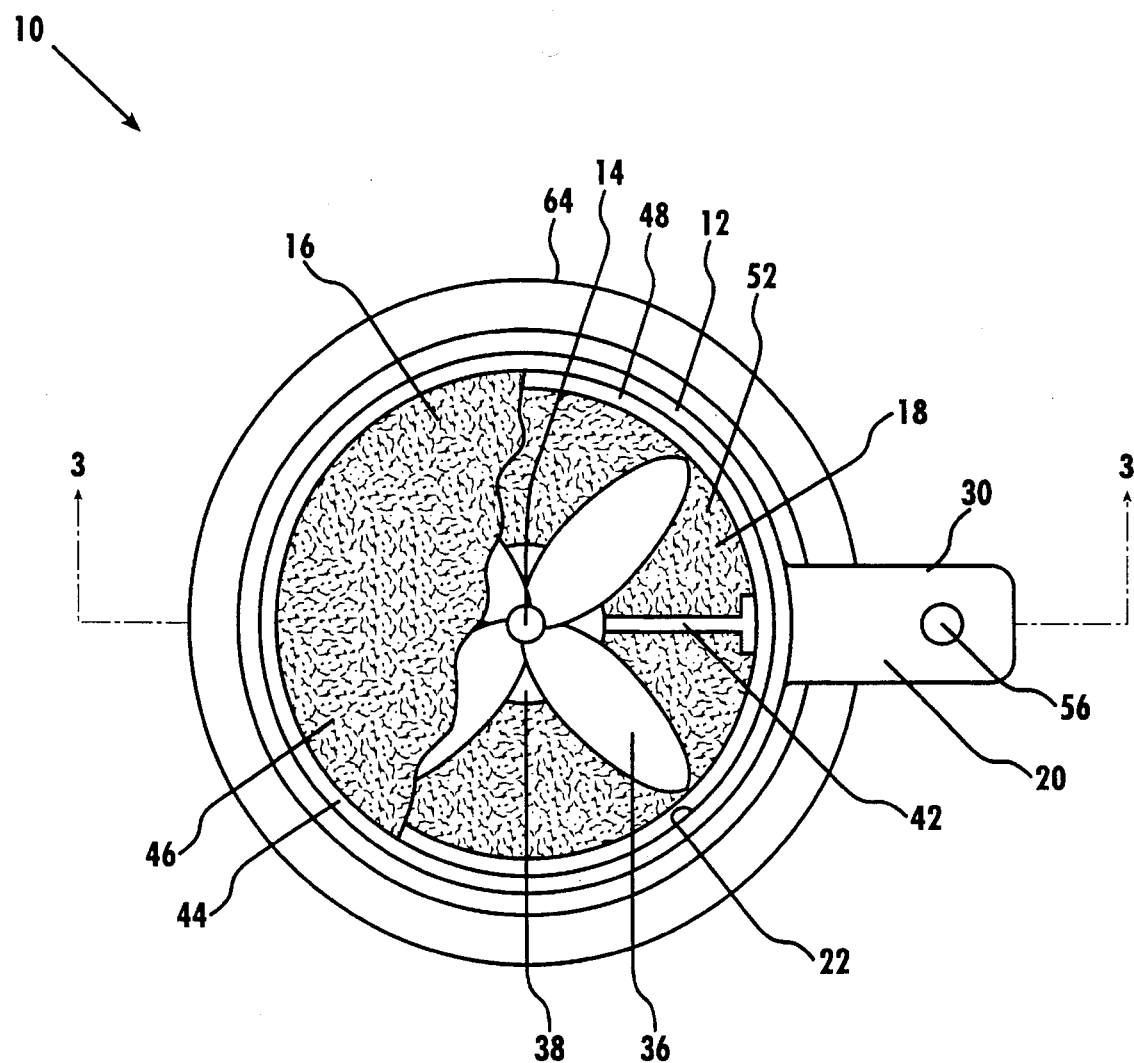
FIG. 2 is a top plan view of the hand-held odor dissipating and removing device of FIG. 1.
Figure 3:
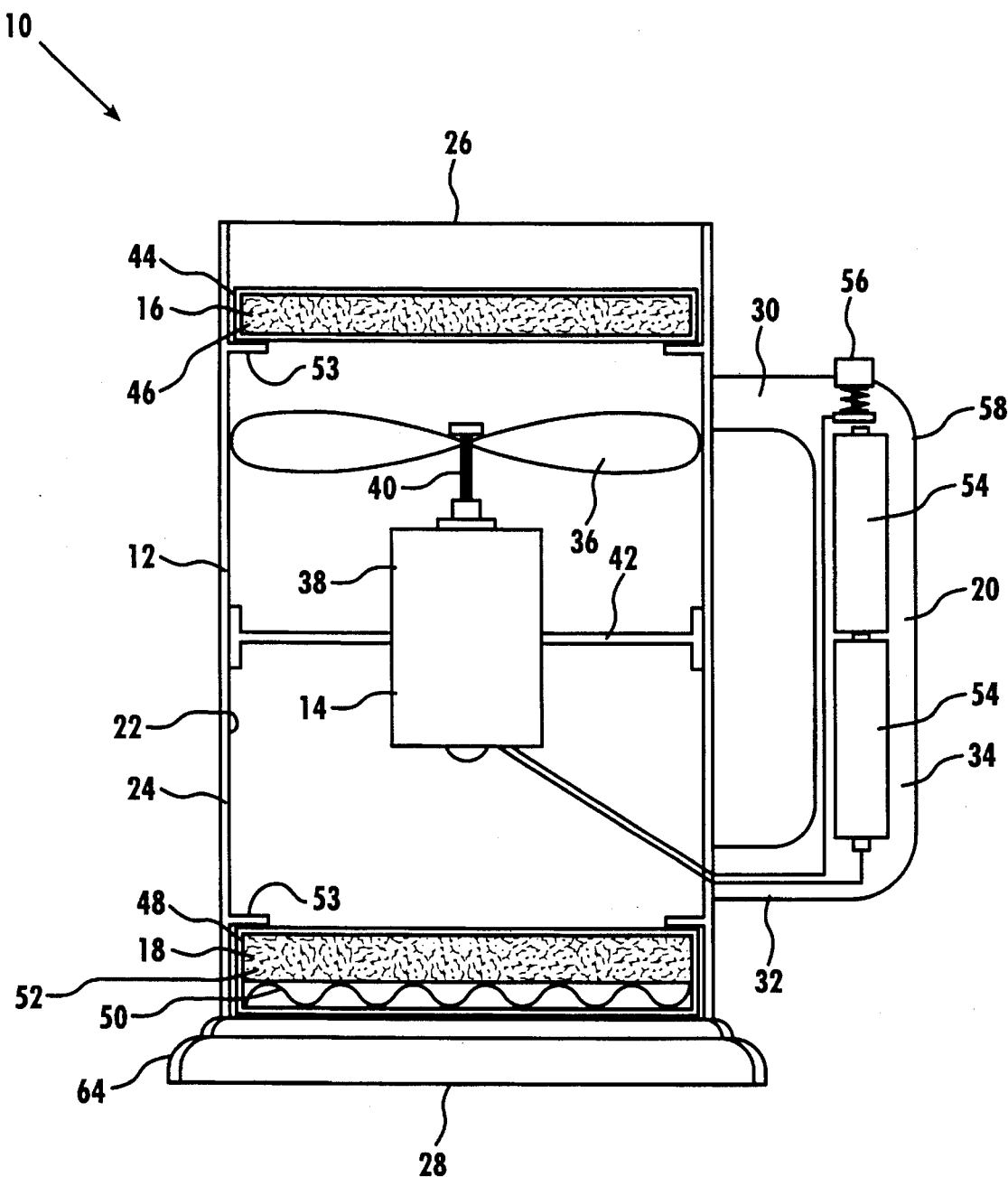
FIG. 3 is a vertical cross sectional view of the hand-held odor dissipating and removing device taken through section line 3—3 of FIG. 2.
Figure 4:
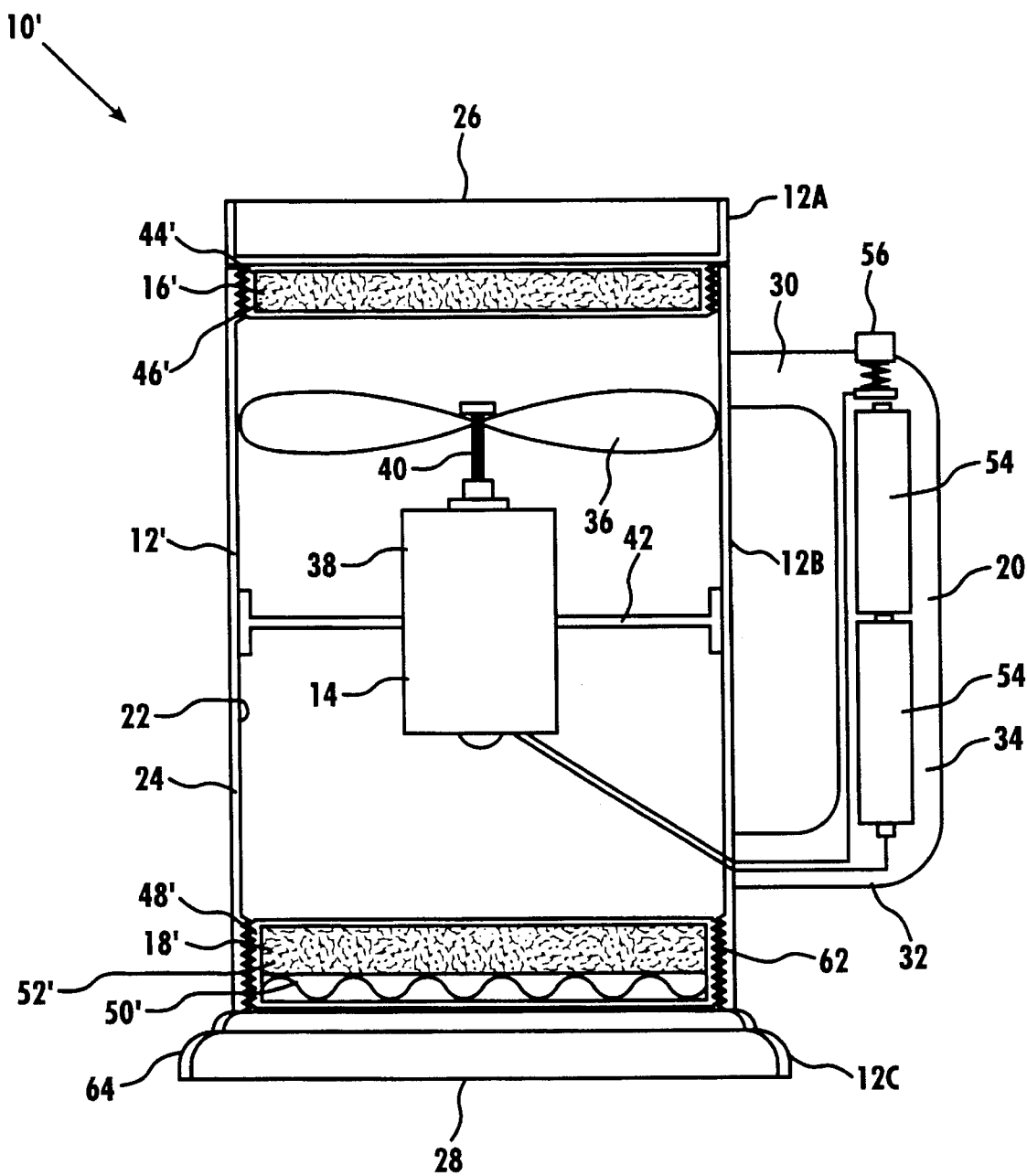
FIG. 4 is a vertical cross sectional view, similar to FIG. 3, showing an alternative embodiment of the hand-held odor dissipating and removing device of the present invention.

FIG. 4, depicts an alternative embodiment, in which housing 12' of deodorizer 10' is comprised of three separate housing portions, i.e., upper portion 12a, middle portion 12b, and lower portion 12c, in lieu of the unitary housing member 12, as shown in FIGS. 1–3. In this arrangement, upper air permeable barrier 16' is preferably fixedly mounted to upper portion 12a, lower air permeable barrier 18' is preferably fixedly mounted to lower portion 12c, and fan 14 is fixedly mounted to middle portion 12b. The top and bottom of middle portion 12b are internally threaded, and the bottom of upper portion 12a and the top of lower portion 12c are externally threaded. Thus, upper and middle portions 12a and 12b of housing 12' are threadably attached at 60, while lower and middle portions 12c and 12b of housing 12' are threadably attached at 62. To replace a filter, the user merely unscrews the respective portion of housing 12', i.e., upper portion 12a or lower portion 12c, and replaces it with a new portion having its respective barrier 16' or 18', fixedly mounted therein.

For both illustrated embodiments, the cylindrical shape of housing 12, the incorporation of handle 20, and the self-contained power supplying system, make deodorizer 10 easily transportable and manipulatable for removing and dissipating odors originating from almost any source. First, the upper and lower horizontal portions 30 and 32 of U-shaped handle 22 are attached to housing 12 on opposing sides of fan 14, and are positioned to balance the weight of deodorizer 10 on opposing sides of handle 20. This facilitates transporting, positioning, and using deodorizer 10, and permits such by only one hand. Further, as deodorizer 10 does not need to receive power from an external source, e.g., a wall socket, deodorizer 10 is freely movable to locations where connection to a wall socket is impossible or inconvenient and the use of an electrical cord is undesirable.

Additionally, as is apparent from FIG. 1, housing 12 and handle 20 are shaped and configured such that deodorizer 10 appears to be a drinking mug. In fact, deodorizer 10 appears substantially identical to a drinking mug from its elevational views. Even switch 56 is slightly raised from the top surface of upper portion 30 of handle 20 to emulate a thumb rest, which is included on many drinking mug designs. Further, in another preferred embodiment, not shown, the top of the switch 56 is flush with the top surface of upper portion 30 of handle 20, so that switch 56 is not easily detectable, and deodorizer 10 is virtually indistinguishable from a drinking mug without a thumb rest, from its elevational views. The useful advantages of such an arrangement will be apparent from the description below.

In operation, the user picks up deodorizer 10 with handle 20 and places air inlet 26 of housing 12 adjacent a source having a foul smell. The user presses switch 56 on handle 20 which energizes fan 14. Fan 14 creates a flow of air which draws air in from air inlet 26, through filter purification devices 46 and 52 reducing or eliminating the bad odor, and through a fragrance impregnated member which masks any remaining bad odor. Further, fan 14 dissipates the odor-reduced and pleasant smelling air through air outlet 28 into the surrounding environment. When deodorizer 10 is not in use, it can be supported on a supporting surface by base 64 at the bottom of housing 12. When supported on a supporting surface by base 64, deodorizer 10 cannot function to draw air through housing 12 because air outlet 28 is sealed against the supporting surface. Thus, to use deodorizer 10, it should be lifted off its supporting surface and moved to a source of unpleasant odors.

The prevent invention is particularly useful to remove and/or eliminate odor from almost any source. For example, deodorizer 10 can be used to treat air in the environment adjacent cigarettes and cigars, moldy objects, remains of foods, animal feces and urine, and other foul smelling items which have caused clothes, carpets, and other articles to become malodorous. The invention also is extremely beneficial for people who have a medical condition in which their body creates an excessive amount of gas, either stomach gas or intestinal gas, which must be discharged through its respective orifice, i.e., mouth or anus. A person with such a condition would pick up deodorizer 10 with handle 20 and place air inlet 26 of deodorizer 10 at the forthcoming source of odor, i.e., his mouth or rear end. He presses switch 56 on handle 20 which energizes fan 14. He then belches or breaks wind into deodorizer 10 aided by the draw of fan 14. The odorous gases from the user's orifice are drawn through the filters 46 and 52 to reduce or eliminate the undesirable odor. Fragrance is emitted from the impregnated member 52 by the draw of air therethrough. The odor-reduced gases, which are now masked by a pleasant scent, are forced out air outlet 28 of deodorizer 10 by fan 14. Further, as such a medical condition can be embarrassing for many people, people with these medical conditions can utilize deodorizer 10 when not in the presence of others, and not be afraid to keep deodorizer 10 in public view, as deodorizer 10 is visually indistinguishable from a drinking mug. Additionally, deodorizer 10 is particularly useful in a closed environment, e.g., the passenger compartment of an automobile, where the natural dissipation of many sources of odor can be particularly unpleasant.

While particular embodiments of the invention have been shown and described, it is recognized that various modifications thereof will occur to those skilled in the art. Therefore, the scope of the herein-described invention shall be limited solely by the claims appended hereto.

What is claimed is:

1. A portable hand-held apparatus for dissipating odors from a source, said apparatus comprising:

a tubular housing, said housing having an interior wall surface, an exterior wall surface, an air inlet at a first longitudinal end, and an air outlet at a second longitudinal end, said interior wall surface between the first longitudinal end and the second longitudinal end defining the boundary of the housing interior;

a handle extending from the exterior surface of said housing, said handle having two spaced apart end sections and a center section therebetween, said spaced apart end sections each including a first end located immediately adjacent the housing and a second end located distal from said housing, said center section being connected to the second ends of said end sections, said exterior wall surface of said housing, said end sections, and said center section forming a void area therebetween, the handle and the void area facilitating the grasping of the apparatus;

an air drawing and exhausting device positioned in said housing interior and attached to said housing, said air drawing and exhausting device including a plurality of fan blades, a motor, and a shaft fixedly attached to the fan blades and rotatably coupled to the motor, whereby energizing the motor causes the fan blades to rotate;

a first air permeable partition attached to the housing and substantially disposed in the housing interior between the air drawing and exhausting device and said first longitudinal end;

a second air permeable partition attached to the housing and substantially disposed in the housing interior between the air drawing and exhausting device and said second longitudinal end;

one of said partitions including a purification filtering device absorbing odors in air drawn therethrough;

a self-contained power supply device electrically coupled to said fan motor; and an operating member electrically coupled to said fan motor and said power supply device permitting the selective energizing of the fan motor;

whereby displacement of said operating member causes said air drawing and exhausting device to draw odorous air from the environment adjacent said air inlet into said air inlet, through said first air permeable partition, and exhaust the air through said second air permeable partition and out of said air outlet dissipating the air into the surrounding environment, and said purification filtering device reducing the odorous content of the air between the air inlet and the air outlet such that the dissipated air exhausted from the air outlet is less odorous than the air drawn into the air inlet.

2. The apparatus of claim 1, wherein at least one of said partitions includes deodorizing material impregnated with a fragrance.

3. The apparatus of claim 1, wherein at least one of said partitions includes a protective screen.

4. The apparatus of claim 1, wherein said housing is a unitary member, and at least one of said partitions being removably mounted within the housing interior.

5. The apparatus of claim 1, wherein said housing includes a plurality of removably coupled cylindrical members, and at least one of said partitions being mounted to one of said cylindrical members.

6. The apparatus of claim 1, wherein said tubular housing is substantially cylindrical, said apparatus further comprising disguising means including said housing and said handle for disguising the appearance of the apparatus as a drinking mug when in public view.

7. The apparatus of claim 1, wherein said operating member is a depressible switch mounted to the handle.

8. The apparatus of claim 1, wherein said handle includes a hollow portion, said self-contained power supply device includes at least one battery positioned inside said hollow portion of said handle.

9. The apparatus of claim 1, wherein said handle is U-shaped, said spaced apart end sections being substantially transverse to the primary direction of air flow, said center section being substantially parallel to the primary direction of air flow, wherein said spaced apart end sections form upper and lower portions of said U-shaped handle, said upper portion of said U-shaped handle attached to the housing above said air drawing and exhausting device, said lower portion of said U-shaped handle attached to the housing below said air drawing and exhausting device.

10. The apparatus of claim 1, wherein said apparatus is completely void of structure above said first longitudinal end of the housing and below said second longitudinal end of the housing facilitating placement of said air inlet immediately adjacent a source of odor.

11. A portable hand-held apparatus for dissipating odors from a source, said apparatus comprising:

a cylindrical housing, said housing having an interior wall surface, an exterior wall surface, an air inlet at a first longitudinal end, and an air outlet at a second longitudinal end, said interior wall surface between the first longitudinal end and the second longitudinal end defining the boundary of the housing interior;

a handle extending from the exterior surface of said housing for grasping by a user;

an air drawing and exhausting device positioned in said housing interior and attached to said housing, said air drawing and exhausting device including a plurality of fan blades, a motor, and a shaft fixedly attached to the fan blades and rotatably coupled to the motor, whereby energizing the motor causes the fan blades to rotate;

a first air permeable partition attached to the housing and substantially disposed in the housing interior between the air drawing and exhausting device and said first longitudinal end;

a second air permeable partition attached to the housing and substantially disposed in the housing interior between the air drawing and exhausting device and said second longitudinal end;

one of said partitions including a purification filtering device absorbing odors in air drawn therethrough;

a self-contained power supply device electrically coupled to said fan motor; and an operating member electrically coupled to said fan motor and said power supply device permitting the selective energizing of the fan motor;

whereby displacement of said operating member causes said air drawing and exhausting device to draw odorous air from the environment adjacent said air inlet into said air inlet, through said first air permeable partition, and exhaust the air through said second air permeable partition and out of said air outlet dissipating the air into the surrounding environment, and said purification filtering device reducing the odorous content of the air between the air inlet and the air outlet such that the dissipated air exhausted from the air outlet is less odorous than the air drawn into the air inlet, said cylindrical housing being completely unobstructed at its air inlet and air outlet, for maneuvering and positioning of the apparatus immediately adjacent the source of odor, wherein said apparatus is contained between said first and second longitudinal ends of the housing and is completely void of structure which extends beyond said first longitudinal end of the housing or extends beyond said second longitudinal end of the housing facilitating placement of said air inlet immediately adjacent a source of odor.

12. The apparatus of claim 11, wherein said housing is a unitary member, and at least one of said partitions being removably mounted within the housing interior.

13. The apparatus of claim 11, wherein said housing includes a plurality of removably coupled cylindrical members, and at least one of said partitions being mounted to one of said cylindrical members.

14. The apparatus of claim 11, wherein said operating member is a depressible switch mounted to the handle, said handle includes a hollow portion, and said self-contained power supply device includes at least one battery mounted inside said hollow portion of said handle.

15. The apparatus of claim 11, further comprising disguising means including said housing and said handle for disguising the appearance of the apparatus as a drinking mug when in public view.

16. The apparatus of claim 11, wherein one of said partitions includes a fragrance impregnated material.

17. The apparatus of claim 11, wherein one of said partitions includes a screen.

18. A portable hand-held apparatus for dissipating odors from a source, said apparatus comprising:

a cylindrical housing, said housing having an interior wall surface, an exterior wall surface, an air inlet at a first longitudinal end, and an air outlet at a second longitudinal end, said interior wall surface between the first longitudinal end and the second longitudinal end defining the boundary of the housing interior;

a handle extending from the exterior surface of said housing for grasping by a user;

an air drawing and exhausting device positioned in said housing interior and attached to said housing, said air drawing and exhausting device including a plurality of fan blades, a motor, and a shaft fixedly attached to the fan blades and rotatably coupled to the motor, whereby energizing the motor causes the fan blades to rotate;

a first air permeable partition attached to the housing and substantially disposed in the housing interior between the air drawing and exhausting device and said first longitudinal end;

a second air permeable partition attached to the housing and substantially disposed in the housing interior between the air drawing and exhausting device and said second longitudinal end;

one of said partitions including a purification filtering device absorbing odors in air drawn therethrough;

a self-contained power supply device electrically coupled to said fan motor; and an operating member electrically coupled to said fan motor and said power supply device permitting the selective energizing of the fan motor;

whereby displacement of said operating member causes said air drawing and exhausting device to draw odorous air from the environment adjacent said air inlet into said air inlet, through said first air permeable partition, and exhaust the air through said second air permeable partition and out of said air outlet dissipating the air into the surrounding environment, and said purification filtering device reducing the odorous content of the air between the air inlet and the air outlet such that the dissipated air exhausted from the air outlet is less odorous than the air drawn into the air inlet, said cylindrical housing being completely unobstructed at its air inlet and air outlet, for maneuvering and positioning of the apparatus immediately adjacent the source of odor;

wherein said handle is U-shaped, said U-shaped handle includes longitudinally spaced upper and lower end sections each being substantially transverse to the primary direction of air flow and forming respective upper and lower portions of said U-shaped handle, and a center section connected to the end sections and being substantially parallel to the primary direction of air flow, said upper portion of said U-shaped handle being attached to the housing above said air drawing and exhausting device, and said lower portion of said U-shaped handle being attached to the housing below said air drawing and exhausting device.

19. A portable hand-held apparatus for dissipating odors from a source, said apparatus comprising:

a cylindrical housing, said housing having an interior wall surface, an exterior wall surface, an air inlet at a first longitudinal end, and an air outlet at a second longitudinal end, said interior wall surface between the first longitudinal end and the second longitudinal end defining the boundary of the housing interior;

a handle extending from the exterior surface of said housing for grasping by a user;

an air drawing and exhausting device positioned in said housing interior and attached to said housing, said air drawing and exhausting device including a plurality of fan blades, a motor, and a shaft fixedly attached to the fan blades and rotatably coupled to the motor, whereby energizing the motor causes the fan blades to rotate;

a first air permeable partition attached to the housing and substantially disposed in the housing interior between the air drawing and exhausting device and said first longitudinal end;

a second air permeable partition attached to the housing and substantially disposed in the housing interior between the air drawing and exhausting device and said second longitudinal end;

one of said partitions including a purification filtering device absorbing odors in air drawn therethrough;

a self-contained power supply device electrically coupled to said fan motor; and an operating member electrically coupled to said fan motor and said power supply device permitting the selective energizing of the fan motor;

whereby displacement of said operating member causes said air drawing and exhausting device to draw odorous air from the environment adjacent said air inlet into said air inlet, through said first air permeable partition, and exhaust the air through said second air permeable partition and out of said air outlet dissipating the air into the surrounding environment, and said purification filtering device reducing the odorous content of the air between the air inlet and the air outlet such that the dissipated air exhausted from the air outlet is less Odorous than the air drawn into the air inlet, said cylindrical housing being completely unobstructed at its air inlet and air outlet, for maneuvering and positioning of the apparatus immediately adjacent the source of odor; and further comprising a base located at the second longitudinal end for supporting the apparatus on a supporting surface when not in use, said apparatus permitting air to be drawn in the air inlet, through the housing, and dissipated through the air outlet when the apparatus is lifted from a supporting surface, and preventing such operation when said apparatus is supported on a supporting surface by said base.

20. A portable hand-held apparatus for dissipating odors from a source, said apparatus comprising:

a cylindrical housing, said housing having an interior wall surface, an exterior wall surface, an air inlet at a first longitudinal end, and an air outlet at a second longitudinal end, said interior wall surface between the first longitudinal end and the second longitudinal end defining the boundary of the housing interior;

a handle extending from the exterior surface of said housing for grasping by a user;

an air drawing and exhausting device positioned in said housing interior and attached to said housing, said air drawing and exhausting device including a plurality of fan blades, a motor, and a shaft fixedly attached to the fan blades and rotatably coupled to the motor, whereby energizing the motor causes the fan blades to rotate;

a first air permeable partition attached to the housing and substantially disposed in the housing interior between the air drawing and exhausting device and said first longitudinal end;

a second air permeable partition attached to the housing and substantially disposed in the housing interior between the air drawing and exhausting device and said second longitudinal end;

one of said partitions including a purification filtering device absorbing odors in air drawn therethrough;

a self-contained power supply device electrically coupled to said fan motor; and an operating member electrically coupled to said fan motor and said power supply device permitting the selective energizing of the fan motor;

whereby displacement of said operating member causes said air drawing and exhausting device to draw odorous air from the environment adjacent said air inlet into said air inlet, through said first air permeable partition, and exhaust the air through said second air permeable partition and out of said air outlet dissipating the air into the surrounding environment, and said purification filtering device reducing the odorous content of the air between the air inlet and the air outlet such that the dissipated air exhausted from the air outlet is less odorous than the air drawn into the air inlet, said cylindrical housing being completely unobstructed at its air inlet and air outlet, for maneuvering and positioning of the apparatus immediately adjacent the source of odor;

wherein said housing includes a plurality of removably coupled cylindrical members, and at least one of said partitions being mounted to one of said cylindrical members.

* * * * *

UNITED STATES PATENT AND TRADEMARK OFFICE
CERTIFICATE OF CORRECTION

PATENT NO. : 5,562,407
DATED : October 8, 1996
INVENTOR(S) : Kevin K. Cielo

It is certified that error appears in the above-indentified patent and that said Letters Patent is hereby corrected as shown below:

Column 5, Line 8, replace "mourning" with --mounting--.

Column 11, Line 4, replace "Odorous" with --odorous--.

Signed and Sealed this

Seventeenth Day of December, 1996

*Attest:*

BRUCE LEHMAN

*Attesting Officer*   *Commissioner of Patents and Trademarks*